LOW CAPACITANCE PLANAR DIODE

Filed Sept. 3, 1964

Robert H. Johnson
James A. Cunningham
INVENTORS

BY John E. Vandigriff 3,319,135

LOW CAPACITANCE PLANAR DIODE

James A. Cunningham, Dallas, and Robert H. Johnson, Richardson, Tex., assignors to Texas Instruments Incorporated, Dallas, Tex., a corporation of Delaware Filed Sept. 3, 1964, Ser. No. 394,159
2 Claims. (Cl. 317—234)

Figures 1A, 1B, 1C, 1D, 1E:
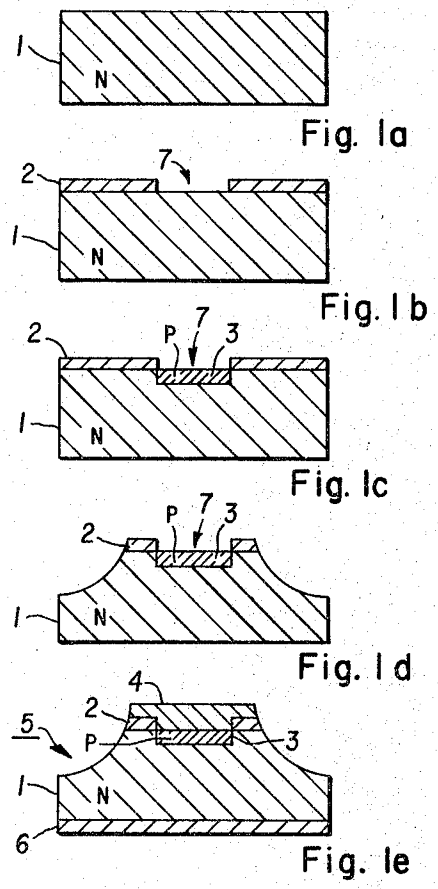

This invention relates to improved semiconductor devices, and more particularly to low capacitance, mesa-planar semiconductor diodes, and to methods of making the same.

Prior planar devices and methods of making them have included the use of metal springs or whiskers which engaged metallized contacts deposited within the planar windows, the use of which involves selective application of an exceptionally thick contact metal to the planar window either by evaporation, electrodeposition, or thermo-compression bonding using a metal ball. These devices and methods are generally unsatisfactory for use in "double plug" packages because the temperature required for making glass-to-metal seals in such packages usually exceeds 1000° C., thus destroying the contacts. As used herein, "single" or "double plug" construction means the known methods of using one or two plugs in fabricating a device for connecting the semiconductor element to external conductors, having approximately the same coefficient of thermal expansion as glass for making a glass-to-metal seal, thus eliminating the necessity of making a glass-to-metal seal between the glass and the conductive wire leads. A "double plug" device could be built by applying a refractory metal to the entire planar device surface, but it would result in exceedingly high device capacitance.

It is therefore the principal object of this invention to provide a method of constructing a low capacitance, mesa-planar semiconductor diode.

A further object of the invention is to provide a low capacitance semiconductor diode compatible with "double plug" construction techniques.

These and other objects of the invention will be more fully understood from the following detailed specification taken in conjunction with the appended claims and attached drawing which show the process steps and the finished device built according to the invention.

Figure 2:
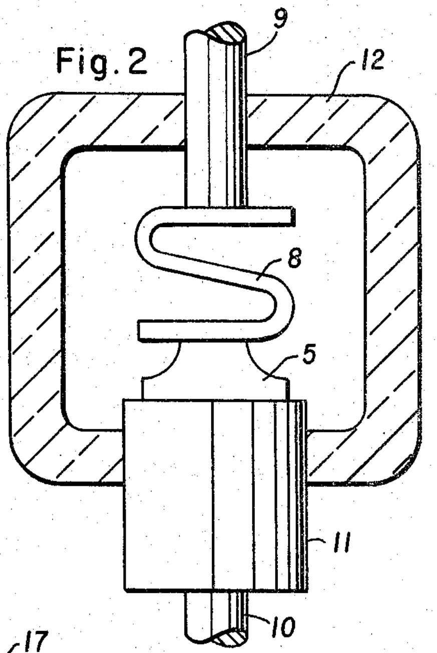
Figure 3:
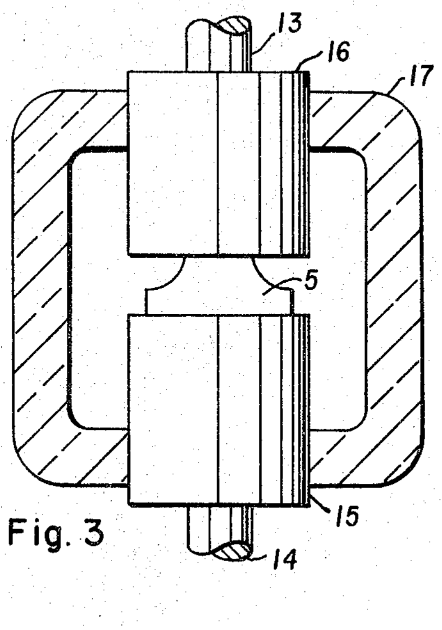

In the drawing, FIGURES 1(a) to 1(e) illustrate the process steps according to the invention;

FIGURE 2 illustrates one example of the finished device of the invention using a whisker and "single plug" arrangement; and FIGURE 3 illustrates a second example of the finished device using a "double plug" construction.

Referring now to the drawing, FIGURES 1(a) to 1(e), show the fabrication of a device beginning with a wafer 1 and ending with the metallized layers 4 and 6. While the embodiment is illustrated with the use of an N-conductivity type wafer, it should be appreciated that the invention is equally operative with P-conductivity type wafer having a subsequent N-conductivity type diffusion therein. FIGURE 1(b) shows an oxide layer 2 on one surface of the wafer 1, with the window 7 being placed therein by any conventional technique, such as a photomask. FIGURE 1(c) shows a P-conductivity type layer 3 diffused through the window 7. FIGURE 1(d) shows the cutting or etching of the mesa to reduce the device capacitance. It will be appreciated that the mesa can be cut as close to the junction created by the P and N layers as desired, thus closely bringing the total device capacitance to that of the junction capacitance. FIGURE 1(e) illustrates the metallized contact layers 4 and 6 both of which can be fabricated on the mesa and lower surface of the wafer 1 by any conventional technique, such as evaporation, to complete the construction of the mesa-planar device 5.

FIGURE 2 illustrates an example of how contact whisker 8 is used with the device 5 in a "single plug" package, comprised of plug 11, glass envelope 12 and conductive leads 9 and 10.

FIGURE 3 illustrates an example of "double plug" construction using the device 5, the fabrication including a glass envelope 17, conductive leads 13 and 14, and plugs 15 and 16.

The plugs as shown in both FIGURES 2 and 3 are conventional, usually consisting of a metal such as Kovar which is compatible with glass for making a glass-to-metal seal with the glass envelopes 12 and 17. Likewise, the remainder of the constituent parts of the finished device, namely the mesa-planar device 5, the wire whisker 8, and plug or plugs 15 and 16, the glass package 12 or 17 and the conductive lead wires 9 and 10 or 13 and 14 may be assembled together using conventional fabrication-techniques.

Although the present invention has been shown and described with reference to a single preferred embodiment, and specific examples have been given showing how the method of the invention is carried out, nevertheless, changes and modifications will occur to those skilled in the art, which do not depart from the teaching of the present invention. For example, the order of the process steps of FIGURE 1 could be changed to have the mesa cut away before the diffusion step. Such changes and modifications are deemed to be within the scope and spirit of the invention as defined in the appended claims.

We claim:

1. A semiconductor diode comprising:
(a) a semiconductor wafer defining a mesa of one conductivity type;
(b) an oxide layer selectively masking a portion of one surface of said mesa;
(c) a diffused semiconductor layer of an opposite conductivity type beneath the unmasked portion of said one surface of said mesa with a P-N junction intermediate said layer and said wafer extending to said one surface beneath said oxide layer;
(d) metallized contact material overlying said oxide layer on said one surface of said mesa in ohmic contact with said diffused semiconductor layer and other metallized contact material on the surface of said wafer opposite to said one surface of said mesa;
(e) a conductive wire whisker, one end of said whisker being attached to said metallized contact material on said one surface of said mesa;
(f) a conductive lead wire, one end of said wire being attached to the other end of said whisker;
(g) a metal plug, one end of which is the mounting surface for the bottom side of said mesa;
(h) another conductive lead wire, one end of which is attached to another end of said metal plug; and
(i) a non-conductive envelope at least partially surrounding said diode.

2. A semiconductor diode comprising:
(a) a semiconductor wafer defining a mesa of one conductivity type;
(b) an oxide layer selectively masking a portion of one surface of said mesa;
(c) a diffused semiconductor layer of an opposite conductivity type beneath the unmasked portion of said one surface of said mesa with a P-N junction intermediate said layer and said wafer extending to said one surface beneath said oxide layer;
(d) metallized contact material overlying said oxide layer on said one surface of said mesa in ohmic contact with said diffused semiconductor layer and other metallized contact material on the surface of said wafer opposite to said one surface of said mesa;

(e) one metal plug, one end of which is attached to said metallized contact material on said one surface of said mesa;

(f) one conductive lead wire, one end of which is attached to another end of said one metal plug;

(g) another metal plug, one end of which is the mounting surface for the bottom surface of said mesa;

(h) another conductive lead wire, one end of which is attached to the other end of said other metal plug; and (i) a non-conductive envelope at least partially surrounding said diode.

References Cited by the Examiner

UNITED STATES PATENTS

| | | | |
|---|---|---|---|
| 3,108,914 | 10/1963 | Hoerni | 317—235 |
| 3,109,758 | 11/1963 | Batdorf et al. | 317—235 |
| 3,184,657 | 5/1965 | Moore | 317—235 |
| 3,189,799 | 6/1965 | Moroney | 317—234 |
| 3,202,912 | 8/1965 | Chynoweth et al. | 317—234 |
| 3,204,321 | 9/1965 | Kile | 317—235 |
| 3,227,933 | 1/1966 | Punte et al. | 317—234 |

FOREIGN PATENTS

| | | |
|---|---|---|
| 1,361,215 | 4/1964 | France. |

JOHN W. HUCKERT, *Primary Examiner.*

J. D. CRAIG, *Assistant Examiner.*